June 26, 1934.    H. E. TAUTZ    1,964,651
SCROLL SAW
Filed May 5, 1933    2 Sheets-Sheet 1

Inventor
HERBERT E. TAUTZ,
By Carl A. Hellmann,
Attorney

June 26, 1934.  H. E. TAUTZ  1,964,651
SCROLL SAW
Filed May 5, 1933   2 Sheets-Sheet 2
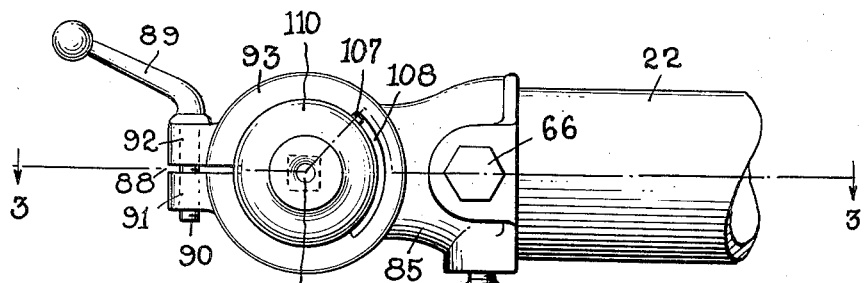
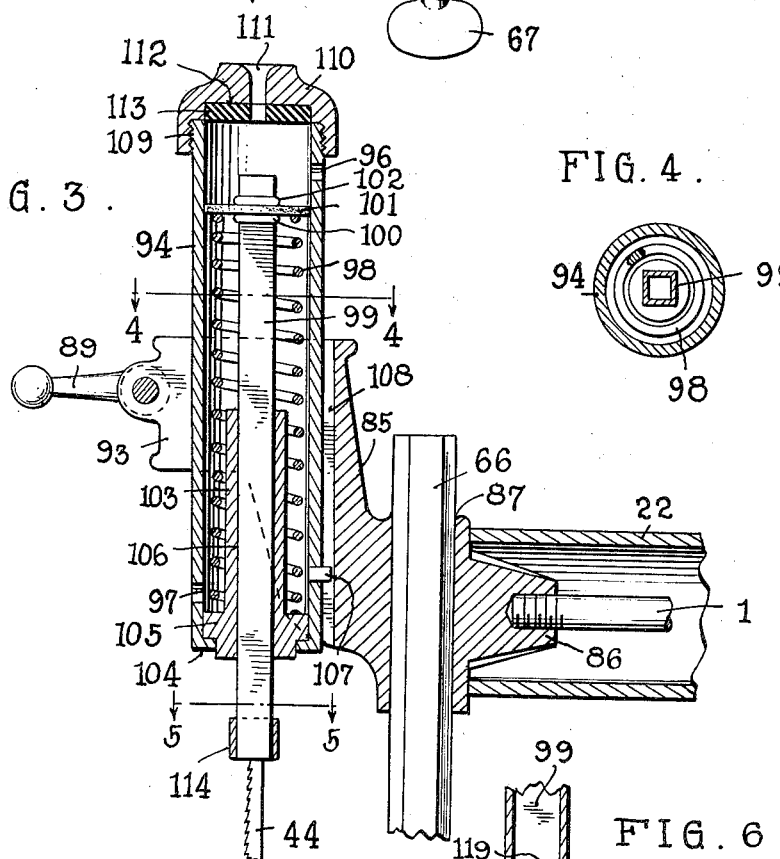
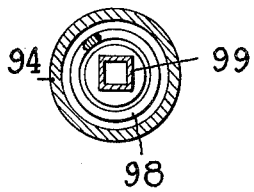
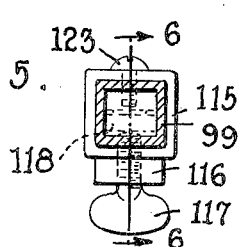
Inventor
HERBERT E. TAUTZ,
By Carl A. Hellmann,
Attorney Patented June 26, 1934

1,964,651

UNITED STATES PATENT OFFICE 1,964,651

SCROLL SAW

Herbert E. Tautz, Milwaukee, Wis., assignor to Delta Manufacturing Company, Milwaukee, Wis.

Application May 5, 1933, Serial No. 669,587

11 Claims. (Cl. 143—70)

My invention relates to scroll saws.

More specifically it relates to improvements in the structure of the head of a scroll saw, particularly one of the type shown, for example, in my prior Patent No. 1,877,705.

Still more specifically, one feature of the present invention relates to means for controlling the tension of the saw blade of a scroll saw.

A further object of the invention is to provide improved means for lubricating the top guide for the saw blade.

More specifically, this object may be accomplished by making the said top guide for the saw blade of a material of the type commonly known as "self-lubricating", that is, a composition usually of a metallic substance and a preferably solid lubricant, such as graphite or the like, and which may be molded or machined into the desired shape.

A still further object is to provide improved means for changing the angular position of the saw blade with respect to the work, by means of a shiftable head having stops controlling its end positions.

Other objects and advantages of my invention will be evident from the various features set forth in the present specification and defined in the claims appended thereto.

For a clear understanding of my invention, reference is to be had to the accompanying drawings, illustrative of several embodiments thereof.

Figure 1:
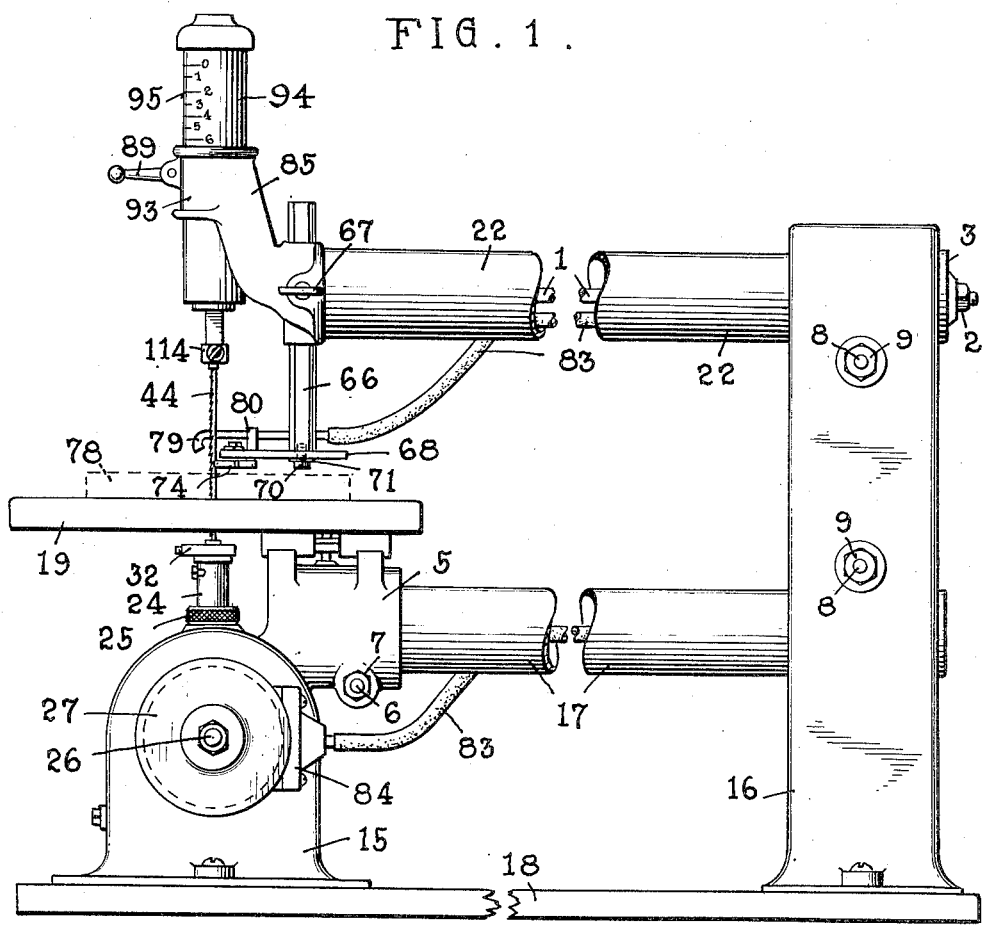
Figure 7:
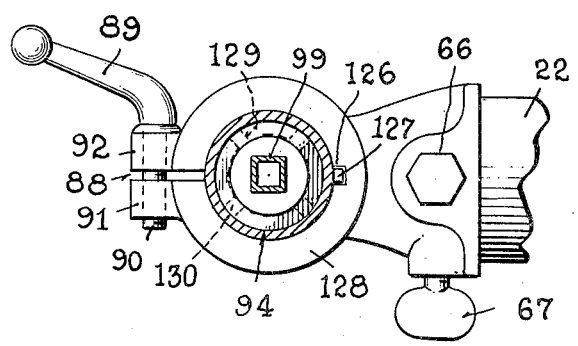

In said drawings:

Fig. 1 is a side elevation of a scroll saw embodying the invention, portions being broken away, to permit illustrating the remaining details on a larger scale, Fig. 2 is a top plan view of the head end of the scroll saw shown in Fig. 1, on a larger scale, Fig. 3 is a longitudinal vertical section through the structure illustrated in Fig. 2, on the plane indicated by the line 3—3, Fig. 4 is a cross section through a portion of the head on the plane indicated by the line 4—4 of Fig. 3, Fig. 5 illustrates means for clamping a saw blade, forming a portion of my invention, this figure being a cross section on the plane indicated by the line 5—5 of Fig. 3, but on an enlarged scale, Fig. 6 is a fragmentary vertical longitudinal section through a portion of the structure shown in Figs. 3 and 5, the section being made on the plane indicated by the line 6—6 or Fig. 5, and Fig. 7 is a view corresponding to Fig. 4, of a modified form of my invention.

In the various figures similar parts are designated by the same reference characters.

Referring first to Fig. 1, I have illustrated a scroll saw embodying certain features of my invention, together with a portion of my older form of scroll saw, in order to show how the invention is to be used. Hereinafter, of course, it will be clearly pointed out, both in the specification and in the claims, just which of the features disclosed in this figure are copied from my older invention and which features are believed to be new and patentable. In this figure, 15 designates a main drive housing which is fixedly secured to a rear support or standard 16 by means of the tubular arm 17, the housing 15 and the support 16 being preferably mountable upon a suitable base, such as 18.

A work table 19 is secured to the drive housing 15 and is mounted to tilt thereon about an axis lying preferably in the upper surface of the table and in line with the saw blade. The work table is provided with a suitable opening for the passage of the saw blade, and with means for securing the said table in any desired adjusted position about its axis.

The housing or crank case 15 contains suitable operating mechanism for reciprocating the lower plunger 24 which is mounted slidably in the bushing 25 secured to the housing. The power for operating the said plunger is transmitted thereto through the crank shaft 26 by means of the pulley 27 which may be rotated by any suitable motor or other source of power. A suitable chuck designated generally as 32 cooperates with the plunger 24 to hold the lower end of a saw blade 44 in order to reciprocate said saw blade through the table.

An air pump 84 is also secured to the housing 15 and actuated by said shaft 26 to provide an air blast which passes through the flexible tube 83 into the tubular arm 17, said tube passing thence upward through the standard 16 and into the upper tubular arm 22, and finally terminating in a nozzle tube 79 adjustably secured in a support 80, to blow away the sawdust from the upper surface of the workpiece 78 resting upon the table 19.

The lower tubular member 17 may be secured to the housing 15 in any desired way, for example by being mounted in a suitable lug 5 secured to the housing 15 and split longitudinally at its lower part, in cooperation with a bolt 6 and nut 7 which will clamp the split lug 5 closely against the member 17. The tubular members 17 and 22 are secured to the rear standard 16 in any desired manner, preferably by providing suitable bores extending through the said standard, the portion of the standard between said bores being slit, and drawn together by means of the bolts 8 and nuts 9 in the manner customary and well known in machine construction.

A preferably polygonal rod 66, in the present case shown as hexagonal in cross section, has a bar 68 adjustably secured to its lower end, for example, by means of a bolt 70, a washer 71 being interposed between the bar and the head of the bolt. The support 80 for the nozzle 79 is also secured to this bar 68 in any desired manner and said bar 68 likewise supports adjustably the rotatable head 74 which has a series of slots at its periphery adapted to receive saw blades 44 of varying widths and thicknesses. All the features so far described are old and are already disclosed in the prior patent, above mentioned, and are described herein merely to illustrate how the improved features cooperate with the old structure.

Referring now to the head designated by reference character 85, in Figs. 1, 2 and 3, it will be noted that this head takes the place of the head 23 disclosed in the prior patent, and is secured rigidly in position and in alinement by means of a rod 1 threaded into a projecting portion thereof as shown at 86 in Fig. 3, said rod extending through the tubular member 22 and being rigidly secured to the other end of said member and to the standard 16 by means of a washer 3 and a nut 2. The rod 66, already mentioned, passes through a suitably formed guideway 87 in the head 85 and is secured at any desired elevation by means of the thumb screw or the like 67, shown in Figs. 1 and 2. It will be noted that the head 85 differs from the head 23 of the prior patent in that instead of extending in a generally horizontal direction as a continuation of the tube 22 it extends upward above said tube, as clearly shown in Figs. 1 and 3. It differs also from the former construction in that it is preferably split in front, as shown best in Fig. 2 at 88 and a bolt 90, having an operating lever 89 secured thereto, is threaded into one portion 91 of said split part, while it passes freely through the other part 92 so that the two parts may be drawn together or again released by proper manipulation of the arm 89.

The cylindrical portion 93 of the said head 85 encircles and fits fairly closely about a tubular member 94 which may be freely moved up or down within the head 85 or rotated therein within certain limits, when the bolt 90 is loosened sufficiently, and again clamped in any desired position of adjustment by tightening the said bolt. The member 94, the internal construction of which is best shown in Fig. 3, has, preferably at the forward portion of its outer surface, a suitable scale 95, as in Fig. 1. The scale 95 is preferably so located as to cooperate with the upper surface of the head 85. Within the tube 94 there is a spring 98 which serves to tension the saw blade 44 which is secured to the lower end of a tubular element 99 of ploygonal cross section, preferably square, as shown in Fig. 4. Near its top portion the said tubular member 99 may be provided with suitable retaining means 100 such, for example, as a bulge or flare of the tube, and a washer 101 of suitable material, for example, fibre or metal, is slipped upon the tube above said expanded portion 100 and secured against the same in any suitable manner, for example, by forming another similar expanded portion 102 in the tube above the said washer 101.

The tubular member 99 is mounted to be freely slidable in a guide or sleeve 103 formed of a suitable composition, such as anti-friction composition sometimes known as an oilless bearing. Such bearings in and of themselves are already well known in the art and form no part of the present invention. They may consist, for example, of a composition comprising graphite or other suitable solid lubricant together with a binder which enables molding the whole into the desired shape. It will be noted that this oilless bearing is preferably rigidly secured to the tube 94, as by being forced into the same and into contact with a flange 104 formed at the bottom of the said tube 94. The said oilless bearing member preferably has a shoulder formed at 105 against which one end of the spring 98 may abut and an elongated portion 106 surrounding the polygonal tube 99 and constituting a bearing and guide for the same which will not require lubrication other than that provided by the bearing material itself. The tube 94 preferably has a projection, lug, or pin 107 secured thereto or formed therein, said member 107 being received within a portion of the head member 85 of enlarged radius, for example the portion shown at 108 in Fig. 2 as of larger radius than the remainder of the bore of the said head. The peripheral extent of the arcuate portion 108 is preferably such that when the pin or lug 107 bears against one vertical end of said portion the saw blade 44 will be held in a position facing forward, that is, toward the operator of the machine, while in the other position, when the member 107 bears against the other end of the said enlarged portion, the saw blade will be positioned at approximately right angles to the former position, the extent of the arcuate portion being thus slightly over 90°, that is, its extent is 90° plus the angular extent of the member 107 itself. The top of the tubular member 94 is preferably provided with threads 109 cooperating with corresponding threads in a cap or nipple 110 which may be threaded upon the same. This cap or nipple preferably has a bore 111 serving as a free outlet for air and also has a recess 112 formed therein in which may be seated and cemented or otherwise secured a washed or pad 113 of suitable yieldable material, such as sponge rubber, felt or the like. It will be noted that due to the fact that the bushing 103 is firmly secured to the tube 94 and the further fact that the tubular member 99 is of polygonal cross section, said tubular member 99 will be definitely correlated to the tube 94 as to its angular position, that is, the tubular member 99 cannot rotate with respect to the tubular member 94, but must keep its definite alinement with respect thereto, so that any movement of rotation of the tubular member 94 will cause the tubular member 99 to perform a similar and equal movement of rotation.

The saw blade 44 is secured to the tubular member 99 by means of a chuck, designated generally as 114, indicated diagrammatically in Figs. 1 and 3 and shown in detail in Figs. 5 and 6. Referring now to Figs. 5 and 6, it will be noted that the chuck comprises a polygonal element 115, in the case illustrated a square collar, and having a projection or lug 116, at one side thereof, through which is threaded a thumb screw 117. The threaded portion of this thumb screw passes through the square tubular member 99 and engages against a loosely mounted, preferably rectangular, block or jaw 118, located within the tube 99 and located also within a suitable cavity 119 formed in a cooperating jaw 120, as best shown in Fig. 6. The jaw 120 is formed to fit within the tube 99 and has a portion 121 extending beyond and below said tube 99, the portion 121 being preferably cylindrical externally and provided with a suitable slot or bore 122 to receive the blade 44. The outer member 115 and the jaw 120 are both secured firmly to the tube 99 by means of a suitable screw or the like 123, which passes freely through the member 115 and the tube 99 and is threaded into the jaw 120 as shown at 124. The jaw 118 has sufficient play within the cavity 119 to enable the blade 44 to be accommodated between the jaw 118 and the cooperating portion of the cavity 119 formed in the opposing jaw 120. In order to prevent the saw blade 44 from becoming caught upon the lower end of the jaw 118 when being inserted into the chuck, the said jaw 118 is preferably tapered at its lower portion, as shown at 125. It is obvious that the saw blade 44 may be readily clamped between the jaws or removed therefrom by merely tightening or loosening the thumb screw 117 and that the movable jaw 118 cannot become lost because it is held within the cavity 119. This forms a chuck, which, while it is extremely light and simple and is delicate enough to hold very fine blades, is nevertheless rugged enough to likewise hold heavier blades which are used for coarser work in the scroll saw art. This chuck is not claimed herein, but is claimed in my co-pending application Serial No. 674,748, filed June 7, 1933, and entitled Scroll saw chucks.

Referring now to Fig. 7 I have illustrated a modified construction of the head. This form differs from that shown in Figs. 2 and 3 in that in place of having the arcuate enlarged portion, 108, a narrow slot 126 is now provided to accommodate a lug or projection 127 on the tubular member 94. This tubular member 94 may be exactly the same as that shown in Figs. 2 and 3 with the exception that the lug or projection 127 is changed in position in order to cooperate correctly with the slot 126, that is, that the projection 127, shown in Fig. 7, is displaced approximately 45° from the corresponding projection, 107, shown in Fig. 2. This, however, is merely a matter of design and convenience and makes it possible to locate the slot 126 at the rear of the bore in the head 128, which otherwise corresponds in function and structure to the head 85 of Figs. 2 and 3 with the exception, as stated, of the form of the slot 126. In this case also the tube 94 has the scale 95. In this form I provide an oilless bearing 129 which takes the place of the bearing 103 of Fig. 3, but which instead of being rigidly secured to the tube 94 is formed with preferably four notches 130 in its lower surface, said notches cooperating with suitable lugs or projections formed in the flange 104 of the tube 94 so that by slightly lifting the bearing 129 it may be freely turned to engage the said slots 130 in any desired order with the cooperating lugs or projections. When the bearing 129 is thus engaged with the lugs it will be firmly held there by reason of the expansive force of the spring 98 which encircles the upper portion 106 of said oilless bearing precisely as in the Fig. 3 form. It will, therefore, be evident that the principal difference between the Fig. 7 form and the form illustrated in Figs. 2 and 3 resides in the fact that instead of turning the tube 94 as a whole this tube is now limited to merely a sliding vertical motion and the rotative adjustment is attained by shifting the bearing 129 instead. In other respects the construction of the Fig. 7 form is identical with that of the other form previously described.

It will be noted that, in the Fig. 7 form, the spring 98 has a dual function, namely, it will accomplish its main purpose of providing the motive power for returning the blade 44 to its initial position on its upstroke and at the same time it will serve the auxiliary purpose or function of urging the self-lubricating bearing or guide 129 against its seat on the flange 104 of the tube 94. These functions could, of course, be accomplished by separate springs or other means, if preferred.

While the operation of the device is believed to be obvious from the above description of the structure, nevertheless it may be desirable to describe such operation in detail to avoid any possible lack of clearness.

Referring first to the form illustrated in Figs. 2 and 3, the saw blade 44 will be suitably inserted in the chuck 114 and properly secured therein by manipulating the thumb screw 117, shown in Figs. 5 and 6. Having secured the blade in position the tube 94 will next be suitably adjusted with respect to the head 85 to produce the desired tension on the blade 44, which is accomplished by raising or lowering the tube 94 and noting the reading on the scale 95 opposite the top edge of the head 85, which is a measure of the compression to which the spring 98 has been subjected. It is clear that certain blades will require tensions different from other blades, for example, relatively fine blades will require less tension than the more rugged and heavy blades, in order to operate most satisfactorily. This adjustment is readily made by merely shifting the tube 94 up or down to the desired extent. At the same time the tube 94 may be rotated within the limits of a right angle imposed by the lug or projection 107 operating in the arcuate portion 108, shown in Fig. 2 to bring the saw blade into the desired position with respect to the work. This is taken care of automatically by reason of the fact that the angular extent of the arcuate slot 108 is made just right to secure such adjustment in cooperation with the particular projection 107 of the tube 94. By manipulating the bolt 90, by means of its handle 89, the tube 94 may then be secured firmly in the desired position of adjustment. In the event that the blade 44 should break, or slip out of either the upper chuck or the lower chuck, for any reason whatever, the spring 98 will cause the tube 99 to spring upward suddenly and such sudden springing would produce an undesirable shock and possible derangement and breakage if it were not for the yieldable pad or washer 113 which will receive the blow of the upper end of the plunger 99 and absorb the resulting shock. The opening 111 will permit the free escape of the air which would otherwise be compressed by the fibre washer 101, which else would act like a dash pot piston and produce undesired damping and waste of power. However, it is clear that if the aperture 111 were made sufficiently restricted, it would also have the effect of providing a dash pot action in the case of accidental breakage or release of the saw blade 44 so that it would suitably restrain the movement of the plunger 99 due to the sudden compression of air between the fibre piston 101 and the cap or nipple 110, so that in certain cases, if preferred, it might even be possible or desirable to omit the yieldable element 113 without sacrificing entirely the advantage of absorbing the shock that would otherwise be produced. In such case, a sufficient normal outlet and inlet for the air may be provided by holes such as 96 and 97 in the tube 94.

Referring now to the operation of the device illustrated in Fig. 7 it will be understood that this form of device will operate exactly the same as that just described, with the exception that, instead of turning the tube 94 as a whole, merely the oilless bearing member 129 is turned with respect to the said tube, this being accomplished by pushing up slightly on the projecting lower edge of the oilless bearing member 129 to release it from the lugs and rotating it through a suitable extent in the desired direction to engage the lugs, when it is again released and forced down by the spring 98. It is clear that the spring 98 will prevent the said bearing member from accidentally slipping off of the retaining lugs. Owing to this adjustability of the oilless bearing member itself it is unnecessary in this form to provide an arcuate slot, such as 108 of Fig. 2, and a straight slot 126 of merely the proper width to accommodate the projection 127 is provided instead. The construction of the upper part of the tubular housing 94 and the cooperating parts may remain the same as in the form already described.

The operation of the chuck is believed to be obvious from Figs. 5 and 6. In order to insert a blade such as 44 it is necessary merely to pass the same upward through the slot or bore 122 in the jaw 120 until it has been entered sufficiently to be positioned between the jaw 120 and the cooperating jaw 118, whereupon the thumb screw 117 is tightened sufficiently to secure the blade 44 firmly in position in the chuck.

It will be obvious that by adopting the construction embodied in the present invention the weight of the movable portion above the saw blade 44 is minimized as far as possible. It will be noted that the tubular member 99 is of relatively small size and is made as thin-walled as possible, consistent with retaining sufficient strength for the purpose in view, and that the washer 101 is also made of light weight material and likewise the upper chuck 114 is made as small and light as possible. Preferably such materials will be selected as will provide a minmum of weight with a maximum of strength, for example, aluminum or magnesium, or alloys thereof, etc. Such alloys are, for example, magnaliums containing from 60% to 90% aluminum, and 40% to 10% magnesium, with a specific gravity ranging from 2.70, for pure aluminum, down to 2.00 or even less for the alloys. In all cases a specific gravity less than 3.00 is desirable. This is a point of great importance in the operation of scroll saws, particularly when delicate blades are used, because the stresses produced in the saw blades when the scroll saw is being operated in the usual way, due to the inertia of the movable upper plunger member, comprising the parts 99, 114 and 101, become excessive at the extremely desirable high speeds of operation of such saw blades and such high speeds are made possible only by restricting said inertia to the greatest possible extent concomitant with retaining sufficient strength of the plunger. High speeds are desirable to insure smoothness of cut and greater cutting speed of the blade, and smoothness of cut is a particularly desirable feature when small blades are used, such as jeweler's blades or "puzzle" blades.

Having described a preferred embodiment of the invention and various modifications thereof, it will be understood that many changes, additions, omissions, etc., can be made therein without departing from the inventive idea, and, therefore, it is not to be considered as limited to the specific embodiments illustrated, but only as specified in the following claims:

I claim:

1. In a scroll saw, the combination of a reciprocatory plunger, a guide for the said plunger, a tubular housing supporting the said guide, a one-piece head supporting the said housing slidably therein, means for preventing relative rotation of the head and the housing, and separate means cooperating with the said head for securing the housing in position within the said head.

2. In a scroll saw, the combination of a reciprocatory plunger, means secured to the plunger for holding an end of a saw blade, a guide for the said plunger, a tubular housing supporting the said guide, a one-piece head supporting the said housing longitudinally adjustable therein, the housing and head being shaped to prevent relative rotation thereof, and means cooperating with the said head for securing the housing in its longitudinally adjusted position within the said head.

3. In a scroll saw, the combination of a reciprocatory plunger, means secured to the plunger, for holding an end of a saw blade, a guide for the said plunger, a disc secured to the plunger near one end of the same, a tubular housing supporting the said guide, and enclosing the portion of the plunger carrying the disc, a head supporting the said housing to be longitudinally adjustable but not rotatable therein, and means cooperating with the said head for securing the housing in its longitudinally adjusted position within the said head.

4. In a scroll saw, the combination of a reciprocatory plunger, means secured to the plunger, for holding an end of a saw blade, a guide made of solid rigid oilless self-lubricating material for the said plunger, a disc secured to the plunger near one end of the same, a tubular housing supporting the said guide, and enclosing the portion of the plunger carrying the disc, a spring surrounding the plunger, the ends of said spring bearing against the guide and the disc respectively, a head supporting the said housing to be longitudinally but not rotatably adjustable therein and means cooperating with the said head for securing the housing in its longitudinally adjusted position within the said head.

5. In a scroll saw, the combination of a reciprocatory plunger, means secured to the plunger, for holding an end of a saw blade, a guide for the said plunger, a disc secured to the plunger near one end of the same, a tubular housing supporting the said guide, and enclosing the portion of the plunger carrying the disc, a head supporting the said housing to be longitudinally adjustable therein, said housing and head being shaped to prevent relative rotation, means cooperating with the said head for securing the housing in its longitudinally adjusted position within the said head, and means for indicating the position of the housing relatively to the head.

6. In a scroll saw, the combination of a reciprocatory plunger, a guide for the said plunger, a tubular housing supporting the said guide, a yieldable member cooperating with the tubular housing and adapted to cushion the plunger in case it should accidentally strike the said member, a head supporting the said housing and means cooperating with the said head for securing the housing in position within the said head.

7. In a scroll saw, the combination of a reciprocatory plunger, a guide for the said plunger, a tubular housing supporting the said guide, a cap at the end of said housing, a yieldable member mounted in the said cap and thus cooperating with the tubular housing, and adapted to cushion the plunger in case it should accidentally strike the said member, a head supporting the said housing and means cooperating with the said head for securing the housing in position within the said head.

8. In a scroll saw, the combination of a reciprocatory plunger, a guide for the said plunger, a tubular housing supporting the said guide, a cap at the end of said housing, a yieldable member mounted in the said cap and thus cooperating with the tubular housing, and adapted to cushion the plunger in case it should accidentally strike the said member, there being an air vent passing through the cap and the yieldable member, a head supporting the said housing and means cooperating with the said head for securing the housing in position within the said head.

9. In a scroll saw, the combination of a reciprocatory plunger, means secured to the plunger, for holding an end of a saw blade, a guide for the said plunger, a disc secured to the plunger near one end of the same, a tubular housing supporting the said guide, and enclosing the portion of the plunger carrying the disc, said housing being provided with at least one completely unobstructed air vent on each side of said disc to prevent compression of the air contained therein when the disc is reciprocated, a head supporting the said housing adjustably therein and means cooperating with the said head for securing the housing in its adjusted position within the said head.

10. In a scroll saw, the combination of a reciprocatory plunger, means secured to the plunger for holding an end of a saw blade, a guide for the said plunger, a tubular housing supporting the said guide, a head supporting the said housing adjustably therein, said head having, in its inner surface, a slot having an arcuate cross section, the tubular housing having a projection extending into said arcuate slot, the dimensions of the said projection and arcuate slot being such that a rotation of the housing within the head will be limited to 90°, said arcuate portion, nevertheless, permitting the housing to be adjusted freely longitudinally of the head, and means cooperating with the said head for securing the housing in its adjusted position within the said head.

11. In a scroll saw, the combination of a hollow reciprocatory plunger, of non-circular cross section, means secured to the plunger, for holding an end of a saw blade, a guide for the said plunger having a bore of corresponding shape, and a tubular housing supporting the said guide, said housing having a flange adjacent one end thereof, the guide bearing against said flange, and having a portion thereof cut away to provide a depression, the flange having a projection adapted to enter into and cooperate with said depression to prevent rotation of the guide with respect to the housing.

HERBERT E. TAUTZ.